United States Patent
Cheong

(10) Patent No.: US 11,399,687 B2
(45) Date of Patent: Aug. 2, 2022

(54) MOVING ROBOT AND CONTROL METHOD THEREOF USING ARTIFICIAL INTELLIGENCE

(71) Applicant: LG ELECTRONICS INC., Seoul (KR)

(72) Inventor: Janghun Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 434 days.

(21) Appl. No.: 16/138,150

(22) Filed: Sep. 21, 2018

(65) Prior Publication Data

US 2019/0090712 A1 Mar. 28, 2019

(30) Foreign Application Priority Data

Sep. 22, 2017 (KR) ........................ 10-2017-0122782

(51) Int. Cl.
*A47L 11/40* (2006.01)
*G05D 1/02* (2020.01)
*G05D 1/00* (2006.01)

(52) U.S. Cl.
CPC ....... *A47L 11/4097* (2013.01); *A47L 11/4061* (2013.01); *G05D 1/0088* (2013.01);
(Continued)

(58) Field of Classification Search
CPC ............ A47L 11/4097; A47L 2201/06; A47L 2201/04; A47L 2201/022; A47L 9/2806;
(Continued)

(56) References Cited

U.S. PATENT DOCUMENTS 6,668,211 B1 * 12/2003 Fujita ................. G05B 19/0426
700/245
9,946,273 B2 * 4/2018 Kusukame ........... H05B 47/105
(Continued)

FOREIGN PATENT DOCUMENTS

JP   H08-123545    5/1996
JP   2000-197599   7/2000
(Continued)

OTHER PUBLICATIONS

Korean Office Action dated Jan. 7, 2019 issued in KR Application No. 10-2017-0122782.
(Continued)

*Primary Examiner* — Jeff A Burke
*Assistant Examiner* — Madison B Emmett
(74) *Attorney, Agent, or Firm* — KED & Associates, LLP

(57) ABSTRACT

The moving robot using artificial intelligence includes: a traveling unit to move a main body; an operation unit to perform a specific operation while generating noise; a sensing unit to sense an ambient situation during traveling; and a controller to determine whether a specific activation condition is satisfied, based on situation information sensed by the sensing unit, and, when the activation condition is determined to be satisfied during traveling, perform a control action to activate a low noise mode so that the operation unit performs the specific operation with relatively reducing the noise. The control method using artificial intelligence includes: determining whether a specific activation condition is satisfied, based on situation information acquired by sensing an ambient situation during traveling; and, when the activation condition is determined to be satisfied, performing a specific operation in an activated state of a low noise mode in which noise is relatively reduced.

15 Claims, 13 Drawing Sheets

(52) U.S. Cl.
CPC ......... *G05D 1/0221* (2013.01); *G05D 1/0227* (2013.01); *A47L 2201/04* (2013.01); *A47L 2201/06* (2013.01); *G05D 2201/0203* (2013.01); *G05D 2201/0215* (2013.01)

(58) Field of Classification Search
CPC .......... A47L 9/2841; G05D 2201/0203; G05D 1/0088
See application file for complete search history.

(56) References Cited

U.S. PATENT DOCUMENTS

| | | | | |
|---|---|---|---|---|
| 2009/0271031 | A1* | 10/2009 | Kwon | G06N 3/008 700/245 |
| 2013/0094656 | A1* | 4/2013 | Fung | H03G 3/32 381/57 |
| 2014/0207282 | A1* | 7/2014 | Angle | G05B 15/02 700/257 |
| 2014/0371909 | A1* | 12/2014 | Lee | G05D 1/0246 700/259 |
| 2015/0250372 | A1* | 9/2015 | T P | A47L 9/2826 701/28 |
| 2016/0330311 | A1* | 11/2016 | Du | G06F 1/1694 |
| 2017/0020356 | A1* | 1/2017 | Zhang | G05B 19/041 |
| 2018/0317725 | A1* | 11/2018 | Lee | A47L 9/2826 |

FOREIGN PATENT DOCUMENTS

| | | |
|---|---|---|
| JP | 2013-169225 | 9/2013 |
| JP | 2013169221 A * | 9/2013 |
| JP | 2013-230294 | 11/2013 |
| JP | 2017-505692 | 2/2017 |
| JP | 2017-064064 | 4/2017 |
| KR | 10-2016-0058594 | 5/2016 |
| KR | 10-2017-0048815 | 5/2017 |

OTHER PUBLICATIONS

International Search Report dated Jan. 14, 2019 issued in International Application No. PCT/KR2018/011255.
European Search Report dated May 19, 2021 issued in Application No. 18859227.3.

* cited by examiner

MOVING ROBOT AND CONTROL METHOD THEREOF USING ARTIFICIAL INTELLIGENCE

CROSS-REFERENCE TO RELATED APPLICATION(S)

This application claims priority under 35 U.S.C. § 119 to Korean Application No. 10-2017-0122782 filed on Sep. 22, 2017, whose entire disclosure is hereby incorporated by reference.

BACKGROUND

1. Field

The present invention relates to a moving robot, a control method for the moving robot, and a control system for the moving robot, and more particularly to machine learning using a network between a moving robot and a server.

2. Background

In general, robots have been developed for industrial purposes and have been in charge of part of factory automation. Recently, robot-applied fields have further extended to develop medical robots or aerospace robots, and home robots that may be used in general houses have also been made. Among those robots, a robot capable of driving on its own is a moving robot. The typical example of a moving robot used at home is a robot cleaner.

There are various technologies of sensing an environment and a user around a moving robot using sensors provided in the moving robot. In addition, there are technologies of enabling a moving robot to map a traveling region using learning techniques so as to figure out the current location on a map.

Recently, technologies have been developed to enable a moving robot to perform a specific operation such as cleaning. Furthermore, various noise prevention or reduction devices have been made to reduce noise that occurs when moving robots perform a specific operation.

BRIEF DESCRIPTION OF THE DRAWINGS

The embodiments will be described in detail with reference to the following drawings in which like reference numerals refer to like elements wherein:

FIG. 9 is a diagram illustrating a main screen on which whether to activate a mode switch function and whether to select a desired condition from a plurality of situation conditions are input;

FIG. 10 is a diagram illustrating a screen on which detailed settings of a low noise mode are input;

DETAILED DESCRIPTION

Figure 1:
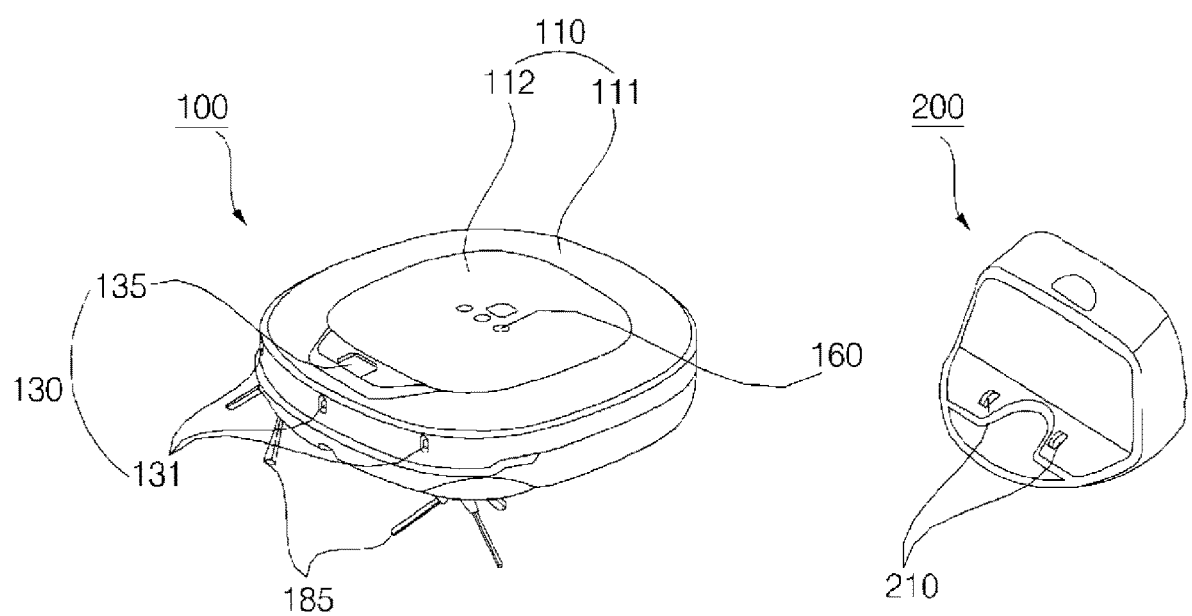
FIG. 1 is a perspective view of a moving robot and a charging station for charging the moving robot, according to an embodiment of the present invention.
Figure 2:
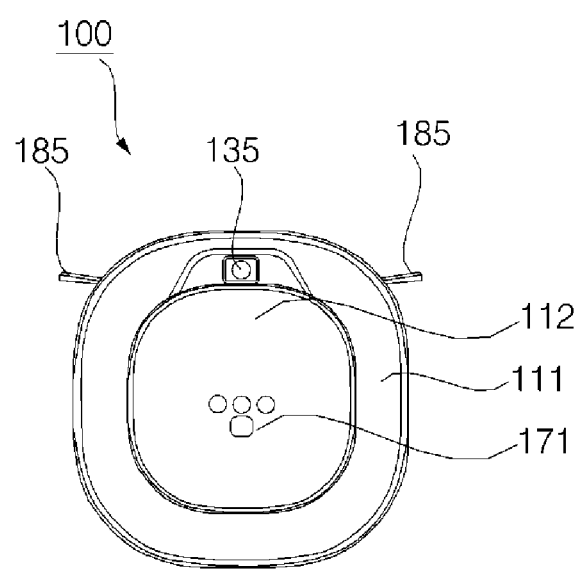
FIG. 2 is an top elevational view of the moving robot of FIG. 1.
Figure 3:
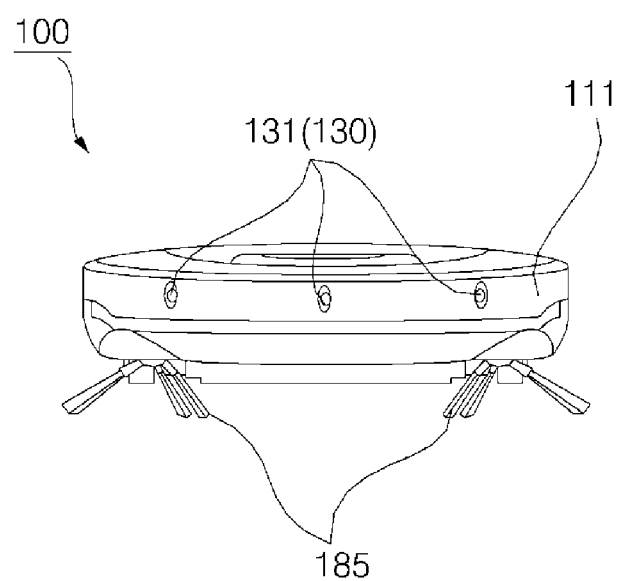
FIG. 3 is a front elevational view of the moving robot of FIG. 1, as seen from the front.
Figure 4:
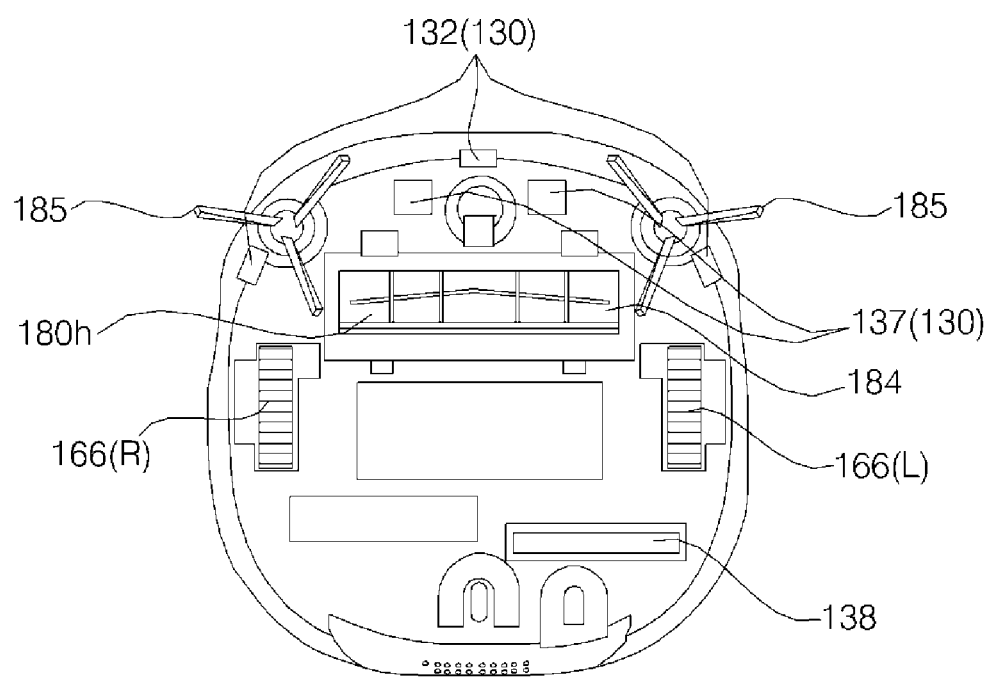
FIG. 4 is a bottom elevational view of the moving robot of FIG. 1, as seen from the bottom.
Figure 5:
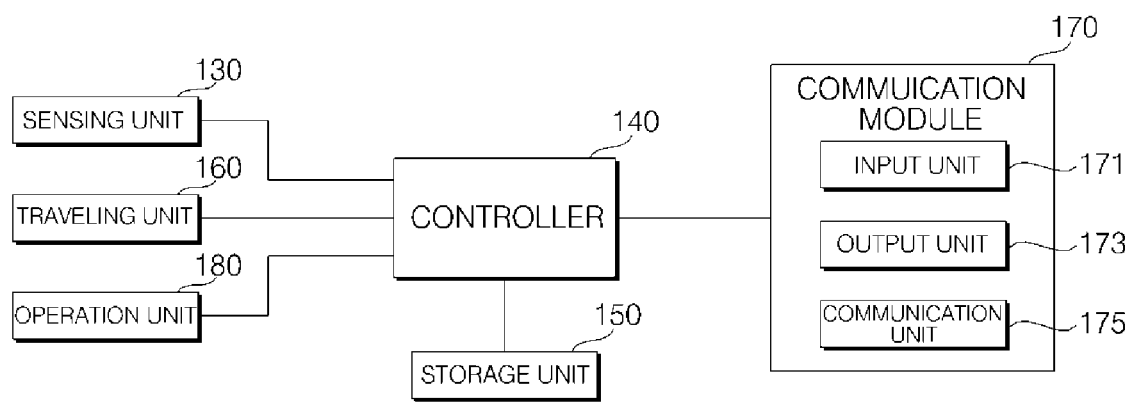
FIG. 5 is a block diagram illustrating control relationships between major components of the moving robot of FIG. 1.

A moving robot 100 according to the present invention refers to a robot capable of moving on its own using a wheel or the like, and the moving robot 100 may include a house keeper robot, a robot cleaner, etc. Hereinafter, with reference to FIGS. 1 to 5, the moving robot 100 is described by taking an example of the moving cleaner, but it is not necessarily limited thereto.

The moving robot 100 includes a main body 110. Hereinafter, a portion of the main body 110 facing the ceiling of a traveling region may be defined as an upper portion (see FIG. 2); a portion of the main body 110 facing the floor of a traveling region may be defined as a bottom portion (see FIG. 4); a portion facing a direction of travel on the circumference of the main body 110 between the upper portion and the bottom portion may be defined as a front portion (see FIG. 3); and a portion opposing the front portion of the main body 110 may be defined as a rear portion. The main body 110 may include a case 111 that forms a space in which various components of the moving robot 100 is accommodated.

The moving robot 100 includes a sensing unit (or sensor) 130 that senses information about the outside of the moving robot 100. The sensing unit 130 may sense information about a traveling region. The sensing unit 130 may sense an obstacle, such as a wall, furniture, and a cliff on a traveling surface. The sensing unit 130 may sense information about a ceiling. The sensing unit 130 may include an object positioned on a traveling surface and/or an external upper object. The external upper object may include a ceiling upward of the moving robot 100, or a lower side surface of furniture. Using information sensed by the sensing unit 130, the moving robot 100 may map a traveling region.

The sensing unit 130 senses an ambient situation. The sensing unit 130 senses a situation around the moving robot 100 during traveling. Due to sensing by the sensing unit 130, situation information is generated.

The sensing unit 130 may sense situation information about a user around the moving robot 100. The sensing unit 130 may sense situation information about an object around the moving robot 100. The sensing unit 130 may include situation information about an object which the user is using or staring at. The sensing unit 130 may sense situation information about a relationship between the user and the object. The sensing unit 130 may sense situation information about a distance to the user. Using a situation information sensing function of the sensing unit 130, the moving robot 100 may determine whether to switch to a low noise mode.

Situation information is information sensed and acquired by the moving robot 100. The situation information may be acquired immediately after being sensed by the sensing unit 130, or may be acquired after being processed by the controller 140. For example, distance information may be acquired immediately using an ultrasonic sensor, and a traveling region is sensed by the sensing unit 130 and mapped to acquire distance information from a map.

The situation information may include information about a user. Using the situation information, the controller 140 may recognize the corresponding user. The "corresponding user" is a user who is determined to perform a specific behavior. The controller 140 may determine that a sensed user is the corresponding user.

The specific behavior may be preset to be a behavior suitable for a low-noise environment. For example, the specific behavior may be talking in person, talking on a phone, reading a book/a tablet PC, watching TV or the like, and/or listening to a radio/music/audio sound.

For example, if the specific behavior is talking in person, the controller 140 may recognize two or more corresponding users who are talking in person. If the specific behavior is talking on a phone, the controller 140 may recognize a corresponding user who is talking on the phone. If the specific behavior is reading, the controller 140 may recognize a corresponding user who is reading. If the specific behavior is watching or listening to something, the controller 140 may recognize a corresponding user who is watching or listening to something.

The corresponding user may be specified as one person or two or more people, depending on situation information. For example, if the specific behavior is talking on a phone or reading/watching/listening to something, the controller 140 may recognize only one corresponding user. For example, if the specific behavior is talking in person, the controller 140 may recognize two or more corresponding users. If a plurality of users are talking in person or reading/watching/listening to something, the controller 140 may recognize two or more corresponding users.

The situation information may include information about an object. Using the situation information, the controller 140 may recognize the corresponding object. The "corresponding object" is an object which is determined to be used by the corresponding user to perform a specific behavior. The controller 140 may determine whether a sensed object is the corresponding object.

For example, if a corresponding user is talking on the phone as a specific behavior, the controller 140 may recognize a telephone or a mobile phone as a corresponding object. For example, if a corresponding user is reading something as a specific behavior, the controller 140 may recognize a book or a tablet PC as a corresponding object. For example, if a corresponding user is watching something as a specific behavior, the controller 140 may recognize a monitor, a tablet PC, a TV, etc. as a corresponding object.

The situation information may include information about a relationship between a corresponding user and a corresponding object. The situation information may include information about a relationship between two corresponding users. Using the situation information, the controller 140 may recognize a corresponding relationship. The "corresponding relationship" is a relationship between a corresponding user an a corresponding object which is expected to be sensed when the corresponding user is performing the specific behavior, or may be a relationship between a plurality of corresponding users who is expected to be sensed when the plurality of corresponding users is performing the specific behavior.

For example, if a plurality of corresponding users is talking in person as a specific behavior, the controller 140 may recognize, as a corresponding relationship, whether a distance between the plurality of corresponding users is within a specific conversation distance. For example, if a corresponding user is talking on a phone as a specific behavior, the controller 140 may recognize, as a corresponding relationship, whether a corresponding object is hiding an ear of the corresponding ear. For example, if a corresponding user is reading something as a specific behavior, the controller 140 may recognize, a corresponding relationship, whether a corresponding object is located within a specific distance in an eye gaze direction of the corresponding user. For example, if a corresponding user is watching a video as a specific behavior, the controller 140 may recognize, as a corresponding relationship, whether a corresponding object is located out of a specific distance in the eye gaze direction of the corresponding user.

The situation information may include image information acquired by a camera or the like. The image information may be acquired using an image sensing unit 135. The image information may be acquired using a lower image sensor 137.

A user or an object may be recognized using the image information. The user's position or gaze may be recognized using the image information. The user's behavior may be recognized using the image information. For example, a distance to each point in an image may be measured using an RGB sensor.

The situation information may include distance information. The distance information may include information about a distance between a user and the moving robot 100. The distance information may include information about a distance between an object and the moving robot 100. The distance information may include information about a corresponding user and a corresponding object.

In one example, the distance information may be acquired using an ultrasonic sensor or a laser sensor which utilizes infrared rays. In this embodiment, the distance information may be acquired using the distance sensing unit 131.

In another example, the distance information may be measured as a distance between any two points on a map. The moving robot 100 may recognize two points and may acquire information about a distance between the two points, which is intended to figure out, using a difference between coordinates on the map.

A distance between two or more corresponding users may be recognized using the distance information. A distance between a corresponding user and a corresponding object may be recognized using the distance information. A distance between a corresponding user and the moving robot 100 may be recognized using the distance information.

The situation information may include sound information acquired by a microphone. The sound information may include information about sound occurring in the outside of the moving robot 100. The sound information may further include information about sound generated by an operation unit (or second motor) 180 of the moving robot 100.

Voice of a corresponding user may be recognized using the sound information. Sound generated by a corresponding object may be recognized using the sound information. Conversation between two or more corresponding users may be recognized using the sound information. A corresponding user's talking on the phone may be recognized using the sound information. A corresponding user's watching a video or listing to a radio/music may be recognized using the sound information.

The sensing unit 130 may include the image sensing unit 135 that senses an image of a nearby object. The image sensing unit 135 may sense an image upward/forward/lateral/backward of the moving robot 100. The image sensing unit 135 may include a digital camera to capture an image of a traveling region. The digital camera may include: at least one optic lens; an image sensor (e.g., a CMOS image sensor) composed of a plurality of photodiodes (e.g., pixels) on which an image is formed by light passing through the optic lens; and a Digital Signal Processor (DSP) which composes an image based on signals output from the photodiodes.

The sensing unit 130 may include a distance sensing unit 131 that senses a distance to a nearby object. The distance sensing unit 131 may be disposed on the front portion or the side portion of the main body 110. The distance sensing unit 131 may sense a nearby obstacle. A plurality of distance sensing units 131 may be provided. The distance sensing unit 131 may be implemented using ultrasonic waves or infrared rays. The distance sensing unit 131 may be implemented using a camera.

The sensing unit 130 may include a cliff sensing unit 132 that senses whether there is a cliff on the floor of a traveling region. A plurality of cliff sensors 132 may be provided. The sensing unit 130 may include a lower image sensor 137 that acquires an image of a floor.

The moving robot 100 may include a traveling unit 160 that moves the main body 110. The traveling unit 160 moves the main body 110 against the floor. The traveling unit 160 may include at least one driving wheel 166 that makes the main body 110 move. The traveling unit 160 may include a driving motor (or first motor). The driving wheel 166 may be provided on the left and right sides of the main body 110, and the driving wheels on the left and right sides of the main body 110 are hereinafter referred to as a left wheel 166(L) and a right wheel 166(R), respectively.

The left wheel 166(L) and the right wheel 166(R) may be driven by a single driving motor, but, if necessary, there may be a left driving motor for driving the left wheel 166(L) and a right driving motor for driving the right wheel 166(R). By setting the left wheel 166(L) and the right wheel 166(R) to rotate at different speeds, a direction of travel of the main body 110 may be changed to the left or right.

The moving robot 100 includes the operation unit 180 that performs a specific operation. The operation unit 180 performs a specific operation while generating noise. For example, noise is generated when a brush is rotated for sweeping and when a suction motor is operated for vacuum suction.

In one example, the operation unit 180 may be provided to do house chores, such as cleaning (sweeping, suction cleaning, mopping, etc.), washing dishes, cooking, washing laundry, taking out trash, etc. In another example, the operation unit 180 may perform an operation such as finding out an object or repelling insects. In this embodiment, the operation unit 180 is described as performing a cleaning operation, but an operation performed by the operation unit 180 is not limited thereto and may include any of various operations.

The moving robot 100 may clean the floor by the operation unit 180 while moving over a traveling region. The operation unit 180 may include a suction device for suctioning foreign substances, brushes 184 and 185 for sweeping, a dust container (not shown) for storing foreign substances collected by the suction device or the brush, and/or a mopping part (not shown) for mopping.

On a suction hole through which air is suctioned may be formed on the bottom portion of the main body 110. The main body 110 may include: a suction device (not shown) for providing a suction force so that air can be suctioned through the suction hole 180$h$; and a dust container (not shown) for collecting dusts suctioned along with air through the suction hole 180$h$. An opening may be formed on the case 111 to insert and detach the dust container, and a dust container cover 112 for opening and closing the opening may be formed rotatably with respect to the case 111.

There may be a roll-type main brush 184, which has bristles exposed through the suction hole 180$h$, and an auxiliary brush 185 which is located on the front side of the bottom portion of the main body 100 and has bristles composed of a plurality of radially extending wings. Due to rotation of the brushes 184 and 185, dusts are removed from the floor of a traveling region, and such dusts are suctioned through the suction hole 180$h$ and collected in the dust container.

The battery 138 may supply power required not just for the driving motor but also for overall operation of the moving robot 100. If the battery 138 is run out, the moving robot 100 may return back to a charging station 200 for charging. During the return, the moving robot 100 may detect a location of the charging station 200 by itself.

The charging station 200 may include a signal transmitter (not shown) for transmitting a specific return signal. The return signal may be an ultrasonic signal or an infrared signal, but it is not limited thereto.

The moving robot 100 includes a communication module (or interface) 170 through which information is input or received. The communication module 170 may output or transmit information. The communication module 170 may include a communication unit (or communication interface) 175 for transmitting and receiving information with respect to an external device. The communication module 170 may include an input unit 171 for inputting information. The communication module 170 may include an output unit 173 for outputting information.

In one example, the moving robot 100 may obtain information directly input to the input unit 171. In another example, the moving robot 100 may receive information, which is input to an additional terminal device 300, through the communication unit 175.

In one example, the moving robot 100 may output information directly to the output unit 173. In another example, the moving robot 100 may transmit information to the additional terminal device 300 through the communication unit 175 so that the terminal device 300 outputs the information.

The communication unit 175 may communicate with an external server, the terminal device 300, and/or the charging station 200. The communication unit 175 may include a signal sensing unit (not shown) for receiving the return signal. The charging station 200 may transmit an infrared signal using the signal transmitter, and the signal sensing unit may include an infrared sensor for sensing the infrared signal. The moving robot 100 moves to the location of the charging station 200 in accordance with the infrared signal transmitted by the charging station 200 so that the moving robot 100 can be docked with the charging station 200. Due to the docking, charging is performed between a charging terminal of the moving robot 100 and a charging terminal 210 of the charging station 200.

The communication unit 175 may receive various command signals from the terminal device 300. The communication unit 175 may receive information from the terminal device 300 such as a smart phone and a computer. The communication unit 175 may receive information as to whether a mode (low noise mode) switch function from the terminal device 300 is activated/deactivated. The communication unit 175 may receive information about settings of the low noise mode from the terminal device 300. The communication unit 175 may receive information about which condition is selected from a plurality of situation conditions.

The communication unit 175 may transmit information which is to be output from the terminal device 300. The terminal device 300 may output the information received from the communication unit 175.

The input unit 171 may receive an On/Off command or other various commands. The input unit 171 may include a button, a key, a touch display, etc. The input unit 171 may include a microphone for recognizing a voice. Although not illustrated in the drawings, information as to whether the mode (low noise mode) switch function is activated/deactivated, information about settings of the low noise mode, and/or information as to which condition is selected from a plurality of situation conditions may be received through the input unit 171.

The output unit 173 may inform a user of various types of information. The output unit 173 may include a speaker and/or a display.

The moving robot 100 may include a controller 140 that processes and determines various types of information, for example, performing mapping and/or recognizing the current location. By controlling various components of the moving robot 100, the controller 140 may control overall operation of the moving robot 100. The controller 140 may be provided to map a traveling region using the image and make the current location recognizable on a map. That is, the controller 140 may perform a Simultaneous Localization and Mapping (SLAM) function.

The controller 140 may receive information from the communication module 170 and process the received information. The controller 140 may receive information from the input unit 171 and process the received information. The controller 140 may receive information from the communication unit 175 and process the received information. The controller 140 may receive the situation information from the sensing unit 130 and process the received situation information.

The controller 140 may provide information to the communication module 170 to output the information. The controller 140 may provide information to the communication unit 175. The controller 140 may control outputting of the output unit 173. The controller 140 may control driving of the traveling unit 160. The controller unit 140 may control operation of the operation unit 180.

The moving robot 100 includes a storage unit 150 for storing various types of data. The storage unit 150 may store various types of information necessary to control the moving robot 100, and may include a volatile or non-volatile recording medium.

The storage unit 150 may store a map of a traveling region. The map may be input by an external terminal device capable of exchanging information with the moving robot 100 through the communication unit 175, or may be generated as a result of learning by the moving robot 100. In the former case, the external terminal device 300 may be, for example, a remote control, a PDA, a laptop, a smartphone, a tablet PC, etc. in which a map setting application is installed.

A real-world traveling region may correspond to a traveling region on the map. The traveling region may be defined as a range including the entire region of a plane where the moving robot 100 has travelled and the region of a plane where the moving robot 100 is currently traveling.

The controller 140 may identify a movement path of the moving robot 100 based on operation of the traveling unit 160. For example, the controller 140 may identify a current or previous speed, a travel distance, etc. of the moving robot 100, and a current or previous direction conversion process based on a direction of rotation of each driving wheel 166(L) or 166(R). Based on the identified travel information of the moving robot 100, a location of the moving robot 100 on the map may be updated. In addition, using the image information, a location of the moving robot 100 on the map may be updated.

The controller 140 may perform a control action so that the low noise mode is activated or deactivated during traveling based on a situation sensed by the sensing unit 130. The moving robot 100 may start to travel in a deactivate state of the low noise mode, and control the low noise mode to be activated during traveling based on the situation information. In another example, the moving robot 100 may start to travel in the activated state of the low noise mode, and control the low noise mode to be deactivated based on the situation information. When traveling in one of an active state and an deactivated state of the low noise mode, the moving robot 100 may be controlled to switch the low noise mode to the other state based on the situation information.

The low noise mode indicates a mode in which the operation unit 180 performs operation while reducing noise to a relatively low level. Noise generated by the operation unit 180 relatively increases in the deactivate state of the low noise mode, whereas it relatively decreases in the activate state of the low noise mode. Even in the activated state of the low noise mode, the degree of noise may vary depending on a noise level which will be described later on.

In the activated state of the low noise, noise may be relatively decreased and efficiency of a specific operation may be relatively decreased. In the deactivated state of the low noise mode, efficiency of the specific operation may be relatively increased and noise may be relatively increased.

The operation unit 180 may include a motor for performing the specific operation. The controller 140 may perform a control action so as to relatively decrease power of the motor of the operation unit 180 in the activated state of the low noise mode. The controller 140 may perform a control action so as to relatively increase power of the motor of the operation unit 180 in the deactivated state of the low noise mode.

The controller 140 may perform a control action so that the motor of the operation unit 180 consumes relatively low power in the activated state of the low noise mode. The controller 140 may perform a control action so that the motor of the operation unit 180 rotates at a relatively low speed in the activated state the low noise mode.

The controller 140 may perform a control action so that the motor of the operation unit 180 consumes relatively high power in the deactivated state of the low noise mode. The controller 140 may perform a control action so that the motor of the operation unit 180 rotates at a relatively fast speed in the deactivated state of the low noise mode.

In the deactivated state of the low noise mode, the controller 140 may determine whether or not a specific activation condition is satisfied based on the situation information. If the activation condition is determined to be satisfied, the controller 140 may activate the low noise mode. If the activation condition is determined not to be satisfied, the controller 140 may deactivate the low noise mode.

In the deactivated state of the low noise mode, the controller 140 may determine whether or not a specific deactivation condition is satisfied, based on the situation information. If the deactivation condition is determined to be satisfied, the controller 140 may deactivate the low noise mode.

Hereinafter, a control method of the moving robot 100 according to embodiments of the present invention will be described with reference to FIGS. 6 to 9. Regarding each flowchart, detailed description of the same configuration and operation thereof will be omitted to avoid redundancy, and the same elements are denoted by the same reference numerals.

The control method may be performed by the controller 140. The present invention may be a control method of the moving robot 100, or the moving robot including the controller that implements the control method. The present invention may be a computer program including each operation of the control method, or a recording medium storing a program that implements the control method using a computer. The "recording medium" indicates a computer readable recording medium. The present invention may be a moving robot control system including both hardware and software.

Each operation in a flowchart of the control method, and a combination of flowcharts of the control method may be implemented by instructions from a computer program. The instructions may be installed by a commercial computer or a specialized computer, and the instructions may generate a mean that performs functions described in a flowchart operation(s).

In addition, in some embodiments, functions for processes may be implemented in a sequence different from mentioned herein. For example, two consecutive processes may be performed at the same time or may be performed in an inverse sequence depending on a corresponding function.

Figure 6A:
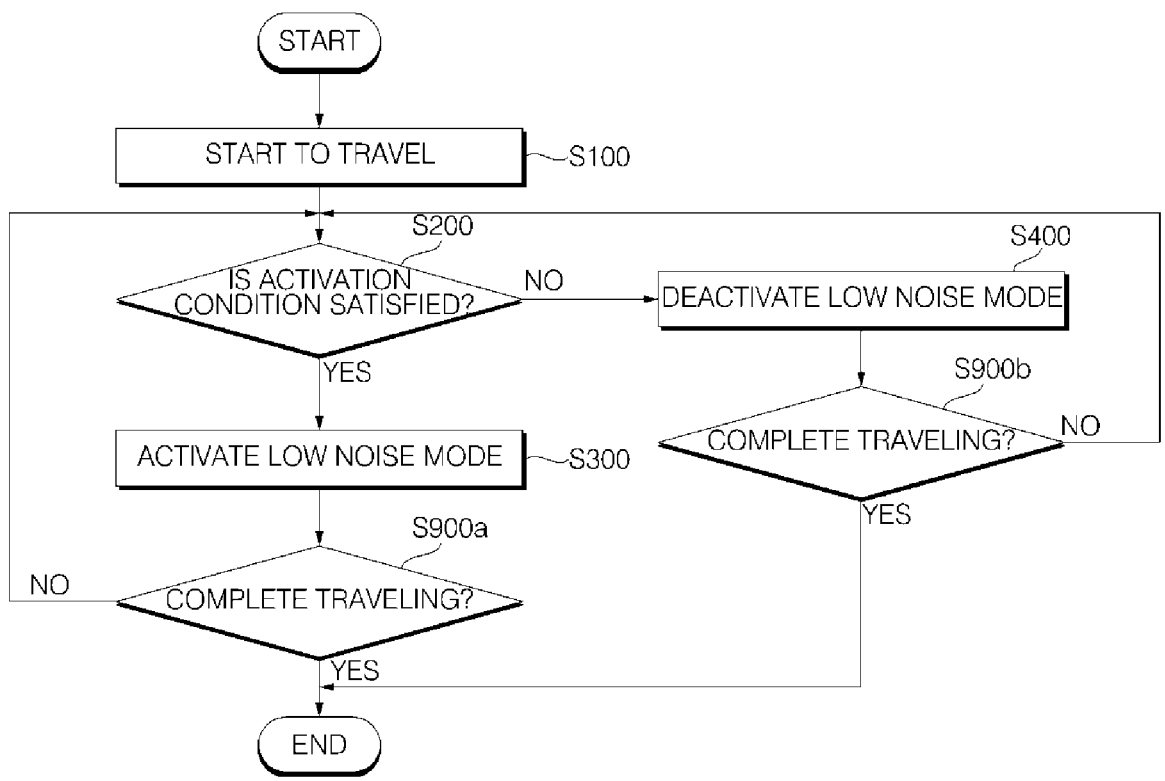
FIG. 6A is a flowchart illustrating a control method of a moving robot according to a first embodiment of the present invention.
Figure 6B:
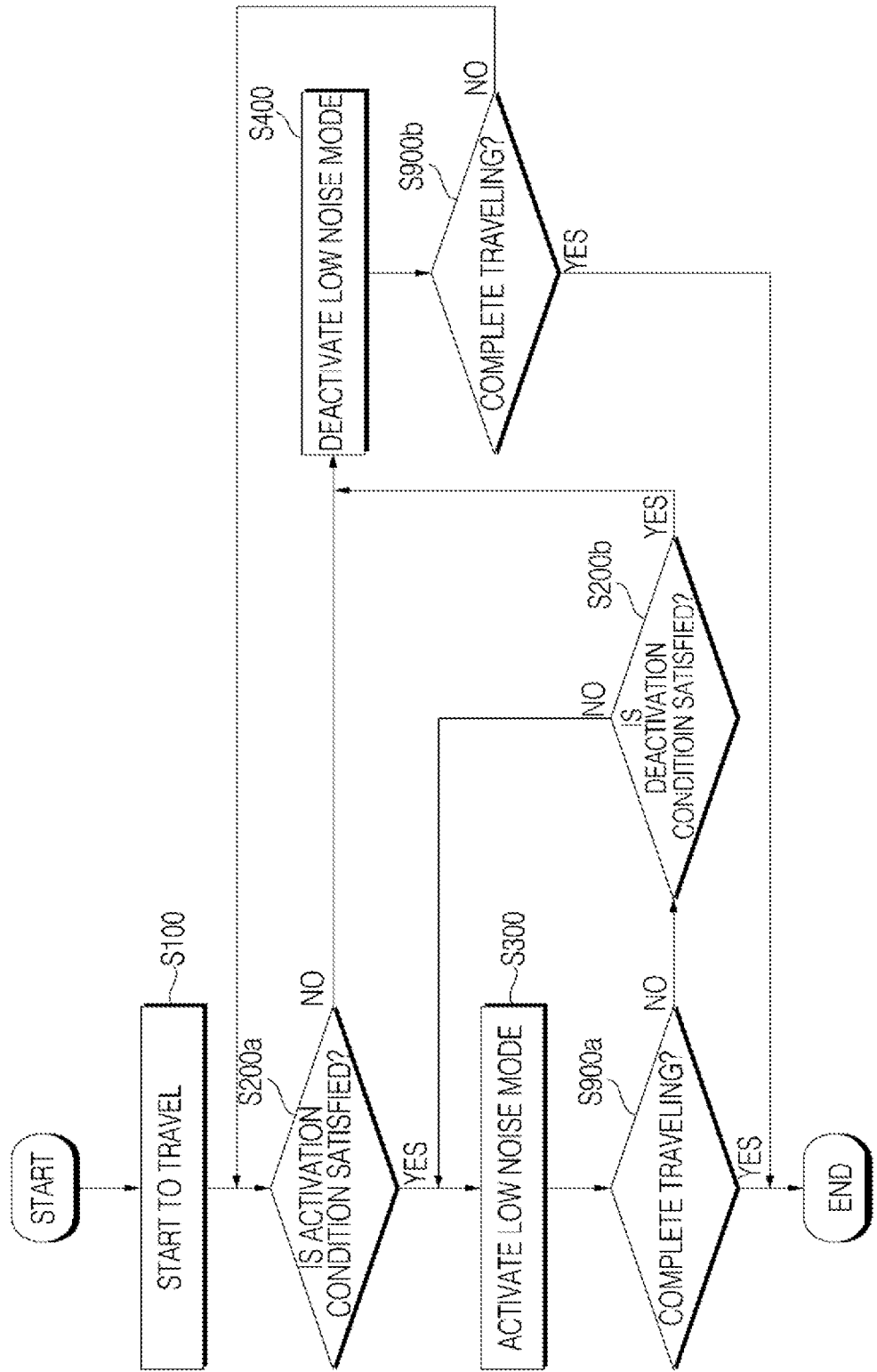
FIG. 6B is a flowchart illustrating a control method of a moving robot according to a second embodiment of the present invention.

Referring to FIGS. 6A and 6B, the control method includes a travel start operation S100 of starting to move over a traveling region by the moving robot 100. The following description is about the case where the low noise mode is in the deactivated state in the travel start operation S100, but it is merely exemplary and the low noise mode may be in the activated state in the travel start operation S100.

After the travel start operation S100, the moving robot 100 travels by the traveling unit 160. After the travel start operation S100, the moving robot 100 senses the situation information during traveling.

The control method includes a determination operation S200, S200a, and S200b for making a determination as to a specific condition based on situation information that is acquired by sensing an ambient situation during traveling. In the determination operation S200, S200a, and S200b, a specification condition for determining whether to activate/deactivate the low noise mode may be determined.

The control method may include a determination operation S200 and S200a of determining, based on the situation information, whether or not a specific activation condition is satisfied. During traveling in the deactivated state of the low noise mode, the moving robot 100 may determine whether or not the activation condition is satisfied. In the determination operation S200 and S200a, the moving robot 100 determines whether or not the activation condition is satisfied, based on situation information that is acquired by sensing an ambient situation in the deactivated state of the low noise mode.

The control method may include a determination operation S200b of determining, based on the situation information, whether or not a specific deactivation condition is satisfied. During traveling in the activated state of the low noise mode, the moving robot 100 may determine whether or not the deactivation condition is satisfied. In the determination operation S200b, the moving robot 100 determines whether or not the deactivation condition is satisfied, based on situation information that is acquired by sensing an ambient situation in the activated state of the low noise mode.

The control method includes an activation operation S300 of performing a specific operation in the activated state of the low noise mode. In the activation operation S300, the moving robot 100 travels in the activated state of the low noise mode. If the activation condition is determined to be satisfied, the activation operation S300 is performed.

The control method includes a deactivation operation S400 of performing a specific operation in the deactivation state of the low noise mode. In the deactivation operation S400, the moving robot 100 travels in the deactivation state of the low noise mode. If the deactivation condition is determined to be satisfied, the deactivation operation S400 is performed.

The control method may include a travel completion determination operation S900a and S900b. In the travel completion determination operation S900a and S900b, it may be determined as to whether a specific travel completion condition is satisfied. If the travel completion condition is satisfied in the travel completion determination operation S900a and S900b, the moving robot 100 may return back to the charging station 200 and complete its traveling. The travel completion condition may include elapsing of a specific time period, completion of a specific operation, and/or dropping of a charged amount of the battery 138 to a specific level or less.

Referring to FIG. 6A, a control method according to a first embodiment includes the determination operation S200 of determining whether the specific activation condition is satisfied. In the first embodiment, if the activation condition is satisfied, the activation operation S300 is performed, and, if the activation condition is not satisfied, the deactivation operation S400 is performed.

Referring to FIG. 6A, detailed description about the first embodiment is provided as below. First, operation S100 of starting to travel in the deactivated state of the low noise mode is performed. During traveling, operation S200 of determining whether or not the activation condition is satisfied is performed. If it is determined in operation S200 that the activation condition is satisfied, operation S300 of keeping traveling while activating the low noise mode is performed. If it is determined in operation S200 that the activation condition is not satisfied, operation S400 of keeping the low noise mode deactivated and keeping traveling is performed.

In the first embodiment, with the low noise mode activated, operation S900a of determining whether or not the travel completion condition is satisfied may be performed.

In addition, with the low noise mode deactivated, operation S900b of determining whether the travel completion condition is satisfied may be performed. If it is determined in operations S900a and S900b that the travel completion condition is satisfied, the moving robot 100 completes its traveling. If it is determined in operations S900a and S900b that the travel completion condition is not satisfied, the moving robot 100 performs the determination operation S200 while keeping traveling.

In the first embodiment, with the low noise mode activated after operation S300, whether the activation condition is satisfied is determined in operation S200. If the activation condition is satisfied, the moving robot 100 keeps the low noise mode activated in operation S300, and, if the activation condition is not satisfied, the moving robot 100 deactivates the low noise mode in operation S400.

In the first embodiment, with the low noise mode being deactivated after operation S400, whether the activation condition is satisfied is determined in operation S200. If the activation condition is not satisfied, the moving robot 100 keeps the low noise mode deactivated in operation S400, and, if the activation condition is satisfied, the moving robot 100 activates the low noise mode in S300.

Referring to FIG. 6B, a control method according to a second embodiment of the present invention includes an activation condition determination operation S200a of determining whether a specific activation condition is satisfied. The control method according to the second embodiment includes a deactivation condition determination operation S200b of determining whether a specific deactivation condition is satisfied. In the second embodiment, if the specific activation condition is determined to be satisfied, the activation operation S300 is performed, and, if the activation condition is determined not to be satisfied, the current state (the deactivated state of the low noise mode) is maintained. In the second embodiment, if the deactivation condition is determined to be satisfied, the deactivation operation S400 is performed, and, if the deactivation condition is determined not to be satisfied, the current state (the activated state of the low noise mode) is maintained.

With reference to FIG. 6B, the second embodiment will be described in more details. First of all, operation S100 of starting to travel with the low noise mode deactivated is performed. Then, during traveling, operation S200a of determining whether the activation condition is satisfied is performed. If it is determined in operation S200a that the activation condition is satisfied, operation S300 of activating the low noise mode and keeping traveling is performed. If it is determined in operation S200a that the activation condition is not satisfied, operation S400 of keeping the low noise mode deactivated and keeping traveling is performed.

In the second embodiment, if it is determined in operation S900a that the travel completion condition is not satisfied, the moving robot 100 performs operation S200b of keep traveling and determining whether the deactivation condition is satisfied. If it is determined in operation S900b that the travel completion condition is not satisfied, the moving robot 100 needs to keep traveling and perform a gain operation S200a of determining whether the activation condition is satisfied.

In the second embodiment, with the low noise mode activated after operation S300, operation S200b of determining whether the deactivation condition is satisfied is performed. If the deactivation condition is not satisfied, the low noise mode remains activated in operation S300, and, if the deactivation condition is satisfied, the low noise mode is deactivated in operation S400.

In the second embodiment, with the low noise mode deactivated after operation S400, operation S200a of determining whether the activation condition is satisfied is performed. If the activation condition is not satisfied, the low noise mode remains deactivated in operation S400, and, if the activation condition is satisfied, the low noise mode is activated and operation S300 is performed.

The activation condition may include a situation condition that is preset to be satisfied when a specific behavior of at least one corresponding user is sensed. The situation condition is preset to determine whether a corresponding user is performing a specific behavior.

The situation condition may include a corresponding user condition that is preset to determine whether a corresponding user is specified. If a corresponding user condition associated with a certain situation condition is satisfied, a corresponding user may be specified for the corresponding situation condition. The specified corresponding user may be one person or two or more people.

The situation condition may further include a corresponding object condition that is preset to determine whether a corresponding object is specified. If a corresponding object condition associated with a certain situation condition is satisfied, whether a corresponding user is performing a specific behavior may be determined accordingly.

The situation condition may further include a corresponding relationship condition that is preset to determine whether there is a corresponding relationship. If a corresponding relationship condition associated with a certain situation condition is satisfied, whether a corresponding user is performing a specific behavior may be determined accordingly.

Figure 11:
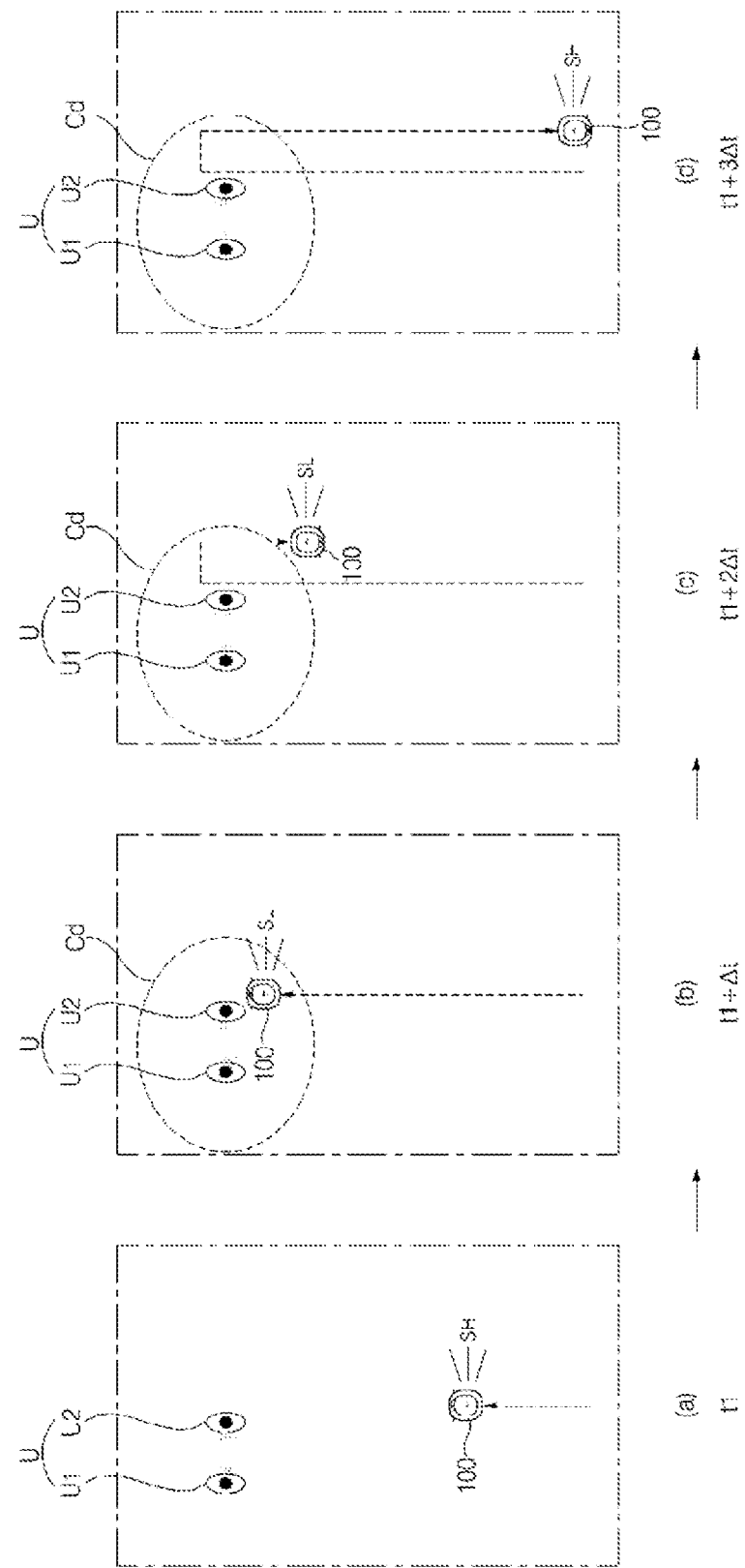
FIG. 11 is a plan view of a scenario where a low noise mode is activated/deactivated when two users U1 and U2 are talking in person.

The activation condition may include an application distance condition that is preset to be satisfied when a sensed distance between the corresponding user and the moving robot 100 is within a specific application distance. Referring to FIG. 11, when two or more corresponding users U1 and U2 are specified, the controller 140 may group the two or more corresponding users U1 and U2 and determine whether an application distance condition is satisfied, based on a sensed distance between the grouped two or more corresponding users and the moving robot 100. The sensed distance may be sensed by a distance sensing unit, or may be sensed by measuring a distance between a position of a corresponding user and a position of the moving robot 100 on a stored map.

It is possible to change the application distance based on information that is input or received through the communication module 170. For example, with reference to FIG. 10, a user may reduce or increase the application distance that is to be reflected in the application distance condition. In doing so, it is possible to change an application distance by taking into consideration the user's auditory acuity or sensitivity, or to set a different application distance for each of multiple specific behaviors for which the low noise mode is required.

Figure 7:
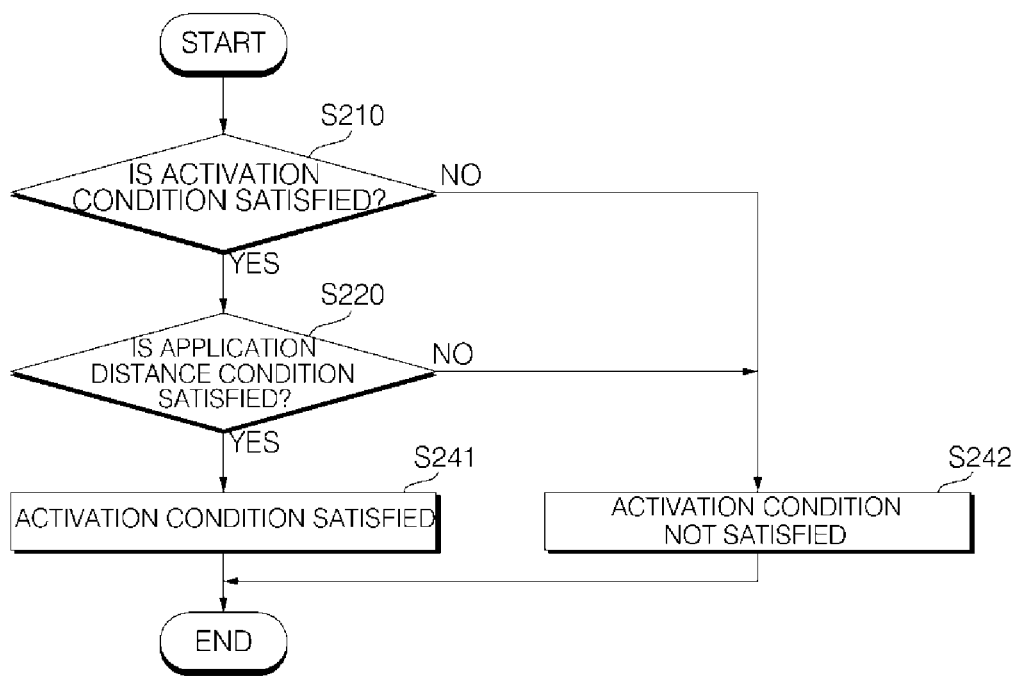
FIG. 7 is a flowchart illustrating an algorithm according to an embodiment of operations S200 and S200*a* in FIGS. 6A and 6B of determining whether an activation condition is satisfied.

Referring to FIG. 7, the activation condition may include a condition in which the situation condition and the application distance condition are satisfied. When the situation condition and the application distance condition are satisfied, the activation condition may be satisfied. The situation condition and the application distance condition may be preset to be an intersection condition.

With reference to FIG. 7, an example of an algorithm for determining whether the activation condition is satisfied will be described as below. In the activation condition determination operation S200 and S200a, operation S210 of determining whether the situation condition is satisfied may be performed. In addition, in the activation condition determination operation S200 and S200a, operation S220 of determining whether the application distance condition is satisfied may be performed. In this embodiment, if the situation condition is satisfied in operation S210, operation S220 is performed, but aspects of the present invention are not limited thereto. If at least one of the situation condition and the application distance condition is determined not to be satisfied, the activation condition is determined not to be satisfied in operation S242. If the situation condition is determined not to be satisfied in operation S210, the activation condition is determined not to be satisfied in operation S242. If the application distance condition is determined not to be satisfied in operation S220, the activation condition is determined not to be satisfied in operation S242. If the situation condition and the application distance condition are satisfied, the activation condition is determined to be satisfied in operation S241. If the application distance condition is determined to be satisfied in operation S220, the activation condition is determined to be satisfied in operation S241.

The deactivation condition may include a release condition in which the activation condition is not satisfied. If the release condition is satisfied, the deactivation condition may be determined to be satisfied.

The deactivation condition may include a situation release condition that is preset to be satisfied when the situation condition is not satisfied. The situation condition is preset to determine whether a corresponding user stops performing a specific behavior.

The deactivation condition includes a distance release condition that is preset to be satisfied when the application distance condition is not satisfied. Referring to FIG. 11, in the case where two or more corresponding users U1 and U2 are specified, the controller 140 may group the two or more corresponding users U1 and U2 and determine whether the distance release condition is satisfied, based on a sensed distance between the grouped two or more corresponding users and the moving robot 100.

The release condition may include the situation release condition and the distance release condition. The release condition may be preset to be satisfied when any one of the situation release condition and the distance release condition is satisfied. The situation release condition and the distance release condition may be preset to be a union condition.

The deactivation condition may include a delay time condition that is preset to be satisfied when a specific delay time elapses with the activation condition satisfied. The delay time condition may be preset to be satisfied when the specific delay time elapses with the release condition satisfied. The delay time condition may be preset to be satisfied when the specific delay time elapses with the situation release condition satisfied. The delay time condition may be preset to be satisfied when the specific delay time elapses with the sensed distance exceeding the application distance. In doing so, it is possible to prevent the low noise mode from unnecessarily switching between the activated state and the deactivated state. In particular, in the case where the moving robot 100 operates by moving over the boundary of a region to which a sensed distance from a corresponding user is within the application distance (see Cd in FIGS. 11 and 12), it is possible to prevent a possibility that unnecessary switching between the activated state and deactivated state of the low noise mode causes inconvenience to the user.

It is possible to change the delay time based on information that is input or received through the communication module 170. For example, with reference to FIG. 10, a user may reduce or increase the delay time that is to be reflected in the delay time condition. In doing so, it is possible to change a delay time by taking into consideration the user's preference and sensitivity.

Figure 8:
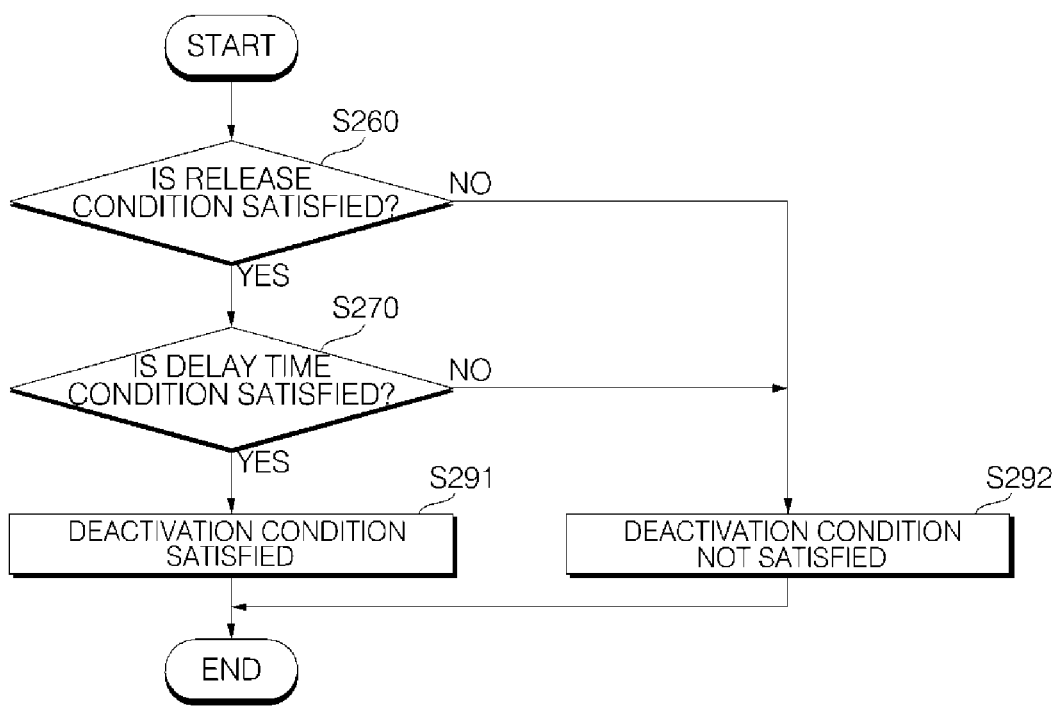
FIG. 8 is a flowchart illustrating an algorithm according to an embodiment of operation S200*b* in FIG. 6B of determining whether a deactivation condition is satisfied.

With reference to FIG. 8, the deactivation condition may include a condition in which the release condition and the delay time condition are satisfied. When the release condition and the delay time condition are satisfied, the deactivation condition may be satisfied. The deactivation condition and the delay time condition may be preset to be an intersection condition.

With reference to FIG. 8, an example of an algorithm for determining whether the deactivation condition is satisfied will be described. In the deactivation condition determination operation S200b, operation S260 of determining whether the release condition is satisfied may be performed. In addition, in the deactivation condition determination operation S200b, operation S270 of determining whether the delay time condition is satisfied may be performed. In this embodiment, if the release condition is satisfied in operation S260, operation S270 is performed, but aspects of the present invention is not limited thereto. If at least one of the release condition and the delay time condition is determined not to be satisfied, the deactivation condition is determined not to be satisfied in operation S292. If the release condition is determined not to be satisfied in operation S260, the deactivation condition is determined not to be satisfied in S292. If the delay time condition is determined not to be satisfied in operation S270, the deactivation condition is determined not to be satisfied in S292. If the release condition and the delay time condition are determined to be satisfied, the deactivation condition is determined to be satisfied in operation S291. If the delay time condition is determined to be satisfied in operation S270, the deactivation condition is determined to be satisfied in S291.

Meanwhile, the activation condition may include at least one situation condition. A plurality of situation condition may be preset. The activation condition may include a condition in which at least one of the plurality of situation conditions is satisfied. That is, the plurality of situation conditions may be preset to be a union condition. The plurality of situation conditions may include first to n-th situation conditions (wherein n is a natural number equal to or greater than 2).

Figure 9:
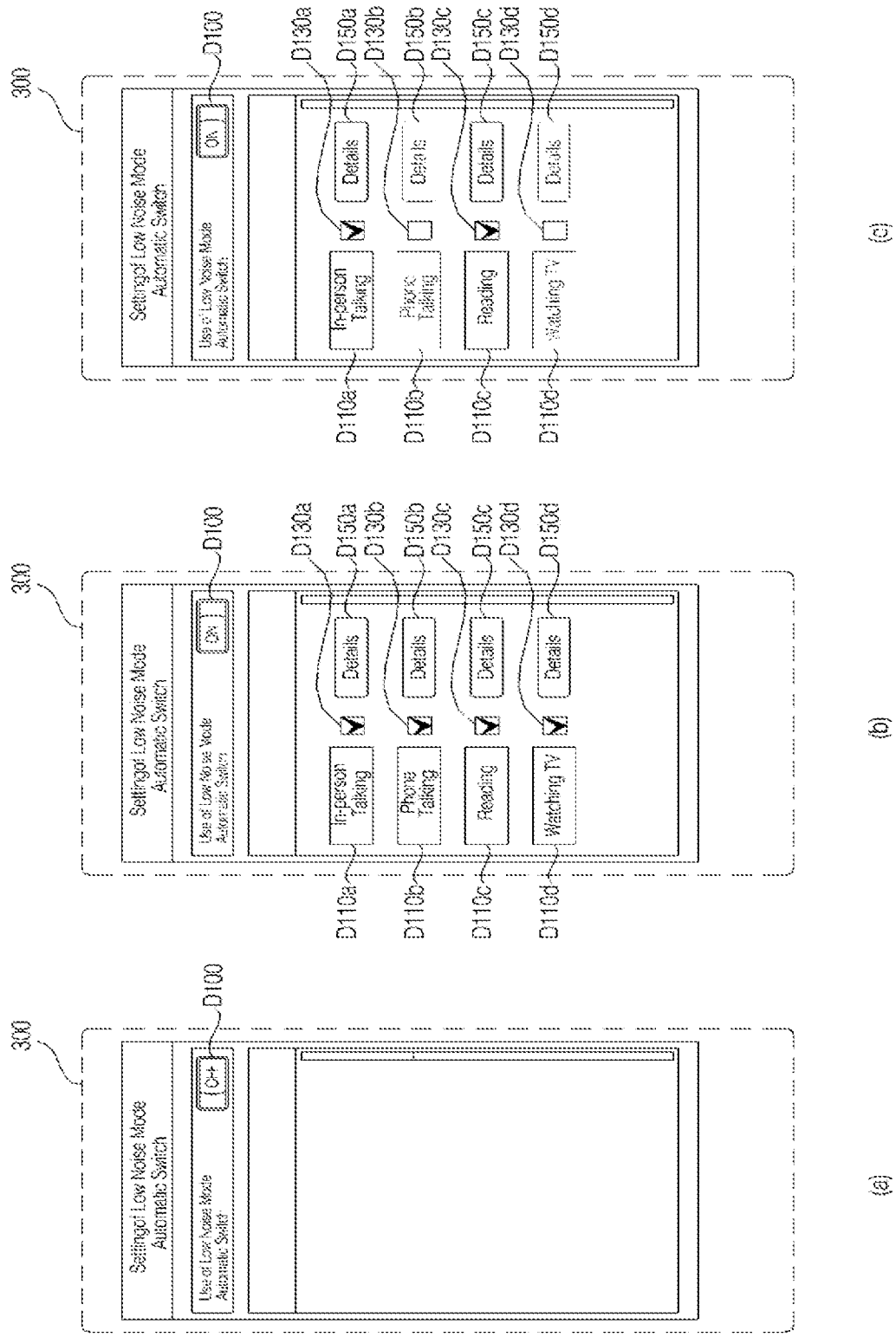
FIGS. 9 and 10 are diagrams illustrating a user environment according to an embodiment of the control method of the present invention, the environment where a user input is allowed to be input.

It is possible to select applying each of the plurality of situation conditions individually. Referring to screens (b) and (c) in FIG. 9, a user may select at least one condition from the plurality of situation conditions (e.g., an in-person talking condition, a phone talking condition, a reading condition, and a watching and listening condition). The screen (b) in FIG. 9 shows an example in which all the plurality of situation conditions are selected, and the screen (c) in FIG. 9 shows an example in which an in-person talking condition and a reading condition are selected from the plurality of situation conditions.

If the plurality of situation conditions is selected, a corresponding user may be specified for each situation condition. In addition, an application distance condition associated with each situation condition may be preset. A different application distance condition may be preset for each situation condition. With respect to each situation, whether a corresponding situation condition and a corresponding application distance condition are satisfied may be determined.

In addition, with the plurality of situation conditions being selected, it may be determined whether a release condition associated with each situation condition is satisfied. With the plurality of situation conditions is selected, it may be determined whether a situation release condition associated with each situation condition is satisfied and whether a distance release condition associated with each situation condition is satisfied, individually. In addition, with the plurality of situation conditions being selected, whether a delay time condition associated with each situation condition is satisfied may be determined. With respect to each situation, whether a release condition and a delay time condition are satisfied may be determined.

For example, a first situation condition (e.g., an in-person talking condition) and a second situation condition (e.g., a reading condition) may be selected, a first application distance condition associated with the first situation condition may be set to 2 m, and a second application distance condition associated with the second situation condition may be set to 1 m. In this case, if the moving robot 100 senses situation information during traveling and recognizes first and second corresponding users satisfying the first situation condition and a third corresponding user satisfying the second situation condition, the low noise mode may be activated in a distance range of 2 m from the first and second corresponding users and may be activated in a distance range of 1 m from the third corresponding user.

For example, if the first and second corresponding users stop having conversation and the third corresponding user keeps reading, a first situation release condition associated with the first situation condition may be satisfied, and thus, the low noise mode may be deactivated in the application distance range from the first and second corresponding users but remain activated within the application distance range from the third corresponding user.

For example, with the first and second situation conditions satisfied, if the moving robot 100 is located out of the application distance from the first and second corresponding users or in the application distance from the third corresponding user, a second application distance condition associated with the second situation condition is satisfied and the moving robot 100 keeps the low noise mode activated at the current location.

For example, even if the moving robot 100 is located out of the application distance from the first and second corresponding users and in the application distance from the third corresponding user, it is determined whether first and second delay time conditions respectively corresponding to the first and second situation conditions are satisfied. If the first and second delay time conditions are all satisfied, the low noise mode switches to a deactivated state.

The following is description about an example of how to determine whether each situation condition is satisfied in the case where a plurality of situation conditions is preset. If at least one condition applied is satisfied among a condition(s) selected by a user from first to n-th situation conditions, it is determined whether an application distance condition associated with the satisfied situation condition is satisfied. If every condition is applied by a user's selection from among the first to n-th situation conditions is not satisfied, the activation condition is determined not to be satisfied. In addition, if no condition is applied by user's selection from among the first to n-th situation conditions, the low noise mode is not activated (wherein n is a natural number equal to or greater than 2).

Step of determining whether to apply each of the first to n-th situation conditions may be performed. Each of the first to n-th situation conditions may be applied or not depending on a user's selection. If p situation condition is determined to apply, it may be determined whether the p situation condition is satisfied (wherein p is any natural number equal to or greater than 1 and equal to and smaller than n). If the p situation condition is determined to be satisfied, it may be determined whether P application distance condition associated with the p situation condition.

Following is description about an example of a plurality of situation conditions composed of an in-person talking condition, a phone talking condition, a reading condition, and a watching and listening condition. The situation conditions may include an in-person talking condition that is preset to be satisfied when two or more corresponding users are talking in person. The in-person talking condition may include a user number condition that is preset to be satisfied when two or more users are recognized. The in-person talking condition may include a speaking condition that is preset to be satisfied when a user is speaking. The conversation condition may include a conversation distance condition that is preset to be satisfied when a conversation distance between two or more corresponding users satisfying the user number condition is within a specific distance. When the user number condition, the speaking condition, and the corresponding relationship condition are all satisfied, the conversation condition may be determined to be satisfied.

For example, in the case where the moving robot 100 recognizes the number of users, if the number of users is determined to be two or more, a first conversation condition is satisfied; if not, the first conversation condition is not satisfied. In the case where the moving robot 100 recognizes a distance between the two or more users, if the distance between the two or more users is within a specific conversation distance (e.g., 1 m), a second conversation condition is satisfied; if not, the second conversation condition is not satisfied. If the second conversation condition is satisfied, the two or more users may be grouped (whether the application distance condition may be determined by sensing a distance between the grouped two or more users and the moving robot 100 or a distance between each of the two or more corresponding users and the moving robot 100). In the case where lip or jaw movement of each of the two or more users is tracked and recognized, if upward and downward lip or jaw movement is recognized within a specific time period (e.g., 10 seconds) after the last recognition of lip or jaw movement, a third conversation condition is satisfied; if not, the third conversation condition is not satisfied. If the first conversation condition, the second conversation condition, and the third conversation conditions are all satisfied, the conversation condition is determined to be satisfied.

The situation conditions may include a phone talking condition that is preset to be satisfied when a corresponding user is recognized as talking on a phone. The phone talking condition may include a hand position condition that is preset to be satisfied when the user's hand is in a specific position. The phone talking condition may include an object position condition that is preset to be satisfied when a corresponding object is in a specific position. The phone talking condition may include a hide condition that is preset to be satisfied when the corresponding object is hiding the user's specific body part. If the hand position condition, the object position condition, and the hide condition are all satisfied, the phone talking condition is determined to be satisfied.

For example, in the case where the moving robot 100 recognizes a user's hand position, if the hand is determined to hide the user's cheek, a first phone talking condition is satisfied; if not, the first phone talking condition is not satisfied. In the case where the moving robot 100 recognizes a corresponding object, if the corresponding object is determined to be positioned between the user's hand and cheek, a second phone talking condition is satisfied; if not, the second phone talking condition is not satisfied. If the corresponding object is determined to hide the user's ear, a third phone talking condition is satisfied; if not, the third phone talking condition is not satisfied. If the first phone talking condition, the second phone talking condition, and the third phone talking condition are all satisfied, the phone talking condition is determined to be satisfied.

The situation conditions may include a reading condition that is preset to be satisfied when a corresponding user is recognized as reading something. The reading condition may include a reading object condition that is preset to be satisfied when a specific reading object, such as a book, newspaper, or a tablet PC, is sensed. The reading condition may include a reading relationship condition that is preset to be satisfied when the reading object is positioned in an eye gaze direction of a corresponding user. The reading relationship condition may be preset to be satisfied when the reading object is positioned within a specific distance in the eye gaze direction of the corresponding user. If the reading object condition and the reading relationship condition are all satisfied, the reading condition may be determined to be satisfied.

For example, in the case where the moving robot 100 recognizes a user's face and a direction in which the face is directed, if a corresponding object is positioned within a specific distance (e.g., 50 cm) in an eye gaze direction of the user, a first reading condition is satisfied; if not, the first reading condition is not satisfied. In the case where the moving robot 100 recognizes shape and size of a corresponding object, if the corresponding object is determined to have a specific shape (e.g., a rectangular shape) and a specific size range (e.g., 30 cm), a second reading condition is satisfied; if not, the second reading condition is not satisfied. If the first reading condition and the second reading condition are all satisfied, the reading condition may be determined to be satisfied.

The situation conditions may include a watching and listening condition that is preset to be satisfied when a corresponding user is recognized as watching a video or listening to a sound. In this embodiment, the watching and listening condition is preset to be satisfied when a corresponding user is watching. Specifically, the watching and listening condition may be preset to be satisfied when a corresponding user is recognized as watching a TV. In another example, the watching and listening condition may be preset to be satisfied when a corresponding user is recognized as listening to a sound.

The watching and listening condition may include a watching and listening object condition that is preset to be satisfied when a specific watching and listening object, such as a TV, is sensed. The watching and listening condition may include a watching relationship condition that is preset to be satisfied when the watching and listening object is positioned in an eye gaze direction of a corresponding user. The watching relationship condition may be preset to be satisfied when the watching and listening object is positioned out of a specific distance in the eye gaze direction of the corresponding user. If the watching and listening object condition and the watching relationship condition are all satisfied, the watching and listening condition may be determined to be satisfied.

For example, in the case where the moving robot 100 recognizes a user's face and a direction in which the face is directed, if a corresponding object is positioned out of a specific distance (e.g., 50 cm) in an eye gaze direction of the user, a first watching and listening condition is satisfied; if not, the first watching and listening condition is not satisfied. In the case where the corresponding object is recognized, if an image is determined to be output in a display region of the corresponding object, a second watching and listening condition is satisfied; if not, the second watching and listening condition is not satisfied. For example, the second watching and listening condition may be preset to be satisfied when color of a rectangle region amounting to 80% or more of a corresponding object has been changed by a specific amount (e.g., 30%) or more for a predetermined time period or less (e.g., 5 seconds). If the first watching and listening condition and the second watching and listening condition are all satisfied, the watching and listening condition may be determined to be satisfied.

Meanwhile, a noise level may be preset to vary even when the low noise mode is activated. In the low noise mode, it is possible to select a noise level of the noise level based on information input or received through the communication module 170. A plurality of noise levels may be preset. Any one of the plurality of noise levels may be selected. For example, with reference to FIG. 10, a user may decrease or increase a noise level in the low noise mode. In the activated state of the low noise mode, the moving robot 100 may operate while decreasing noise based on a selected noise level. In doing so, it is possible to change a degree of the decrease in noise in the low noise mode according to a user's selection.

Figure 10:
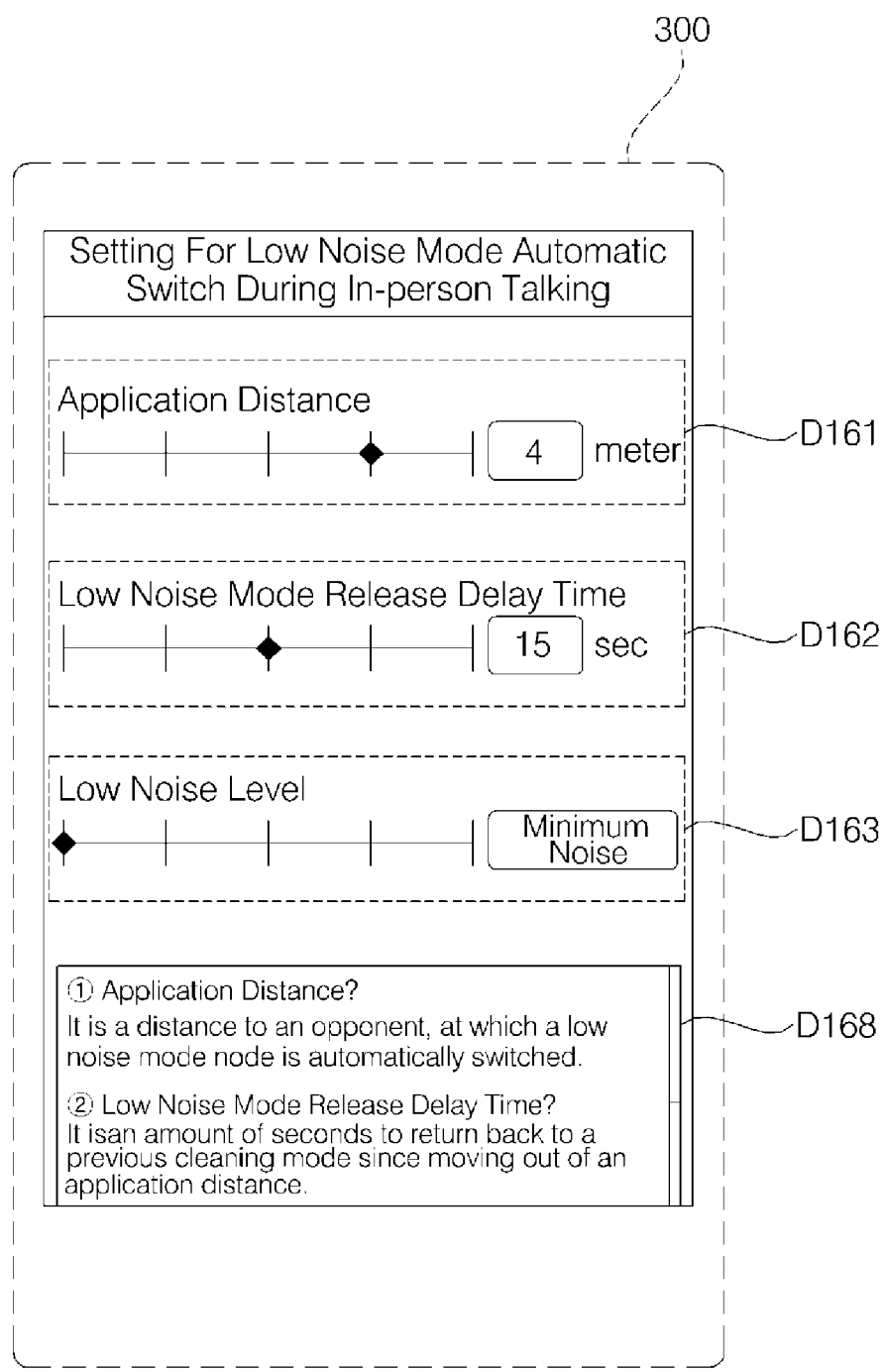

In addition, the low noise mode may be set to have a different noise level in response to satisfaction of each of a plurality of situation conditions. With reference to FIGS. 9 and 10, on a detailed setting screen corresponding for each situation condition, the low noise mode may be set to have a different noise level of in response to satisfaction of each situation condition.

Hereinafter, an example of a user environment (or user interface) where the control method is implemented will be described with reference to FIGS. 9 and 10. FIGS. 9 and 10 are diagrams illustrating a display of the terminal device 300 as an example of a display screen, but aspects of the present invention are not limited thereto. In addition, this embodiment shows a method of touching a screen to select a display region and an input region on a screen shown in FIGS. 9 and 10, but aspects of the present invention are not limited thereto.

In this embodiment, information input to the additional terminal device 300 is received through the communication unit 175, and the screen shown in FIGS. 9 and 10 is a screen of a touch screen of the terminal device 300. However, in another example, information may be received from the input unit 171, such as a touch screen or a button of the main body 110 of the moving robot 100, and the screen shown in FIGS. 9 and 10 may be implemented on the touch screen of the main body 110.

In addition, the moving robot 100 may transmit information to the additional terminal device 300 through the communication unit 175 to output information on the screen of the terminal device 300, and may output information directly to the output unit 173 such as a display unit. Referring to FIG. 9, a main screen through which setting of the low noise mode is input may be output. There may be an activation selection input part D100 for a low noise mode switch function (which is a function for switching to the low noise mode depending on situation information). A user may select the activation selection input part D100 by touching or like the activation selection input part D100 to turn on/off the low noise mode switch function. In FIG. 9, section (a) shows the case where the low noise mode switch function is turned off, and sections (b) and (c) show the cases where the low noise mode switch function is turned on.

With reference to sections (b) and (c) in FIG. 9, there is a plurality of situation indicators D110a, D110b, D110c, and D110d which respectively indicate situation names of a plurality of situation conditions. There may be first to n-th situation indicators respectively corresponding to first to n-th situation conditions. For example, there may be a situation indicator D110a corresponding to the conversation condition, a situation indicator D110b corresponding to the phone talking condition, a situation indicator D110c corresponding to the reading condition, and a situation indicator D110d corresponding to the watching and listening condition.

With reference to sections (b) and (c) in FIG. 9, there is a plurality of applied-status indicators D130a, D130b, D130c, and D130d which indicates whether the plurality of respective situation conditions is applied. There may be first to n-th indicators respectively corresponding to the first to n-th situation conditions. A user may change an applied status of each situation condition by touching the situation indicators D110a, D110b, D110c, and D110d or the selection indicators D130a, D130b, D130c, and D130d to select. For example, the screen (b) in FIG. 9 shows the applied-status indicators D130a, D130b, D130c, and D130d in the case where the in-person talking condition, the phone talking condition, the reading condition, and the watching and listening condition are all applied. The screen (c) in FIG. 9 shows the applied-status indicators D130a, D130b, D130c, and D130d in the case where the in-person talking condition and the reading condition are applied while the phone talking condition and the watching and listening condition are not applied.

With reference to sections (b) and (c) in FIG. 9, there is a plurality of setting input parts D150a, D150b, D150c, and D150d to set details of each of the plurality of situation conditions. There may be first to n-th setting input parts respectively corresponding to the first to n-th situation conditions. A user may change detailed settings of each situation condition by touching any one of the plurality of setting input parts D150a, D150b, D150c, and D150d to select. For example, if a user touches anyone of the plurality of setting input parts D150a, D150b, D150c, and D150d to select, a detailed setting screen for a corresponding situation condition may be output (see FIG. 10).

With reference to FIG. 10, a screen for detailed settings of a situation condition will be described as below. There may be an application distance input part D161 for changing an application distance to be reflected in the application distance condition. It is possible to change the application distance by moving a pointer (e.g., a diamond shaped pointer) of the application distance input part D161 leftward or rightward. For example, using an application distance input part D161 corresponding to a p situation condition, it is possible to change an application distance to be reflected in a P application distance condition (wherein p is a natural number equal to or greater than 1 and equal to or smaller than n).

With reference FIG. 10, there may be a delay time input part D162 for changing a delay time to be reflected in the delay time condition. It is possible to change the delay time by moving a pointer (e.g., a diamond-shaped pointer) of the delay time input part D162 leftward or rightward. For example, using a delay time input part D162 corresponding to the p situation condition, it is possible to change a delay time to be reflected in the p situation condition.

With reference to FIG. 10, there may be a noise level input part D163 for changing the noise level when the low noise mode is activated. It is possible to change the noise level by moving a pointer (e.g., a diamond-shaped pointer) of the noise level input part D163 leftward or rightward. For example, using a noise level input part D163 corresponding to the p situation condition, it is possible to change a noise level to be applied in a low noise mode where the p situation condition is satisfied.

In addition, there may be a description display part D168 where description about a plurality of input parts D161, D162, and D163 is displayed.

Figure 12:
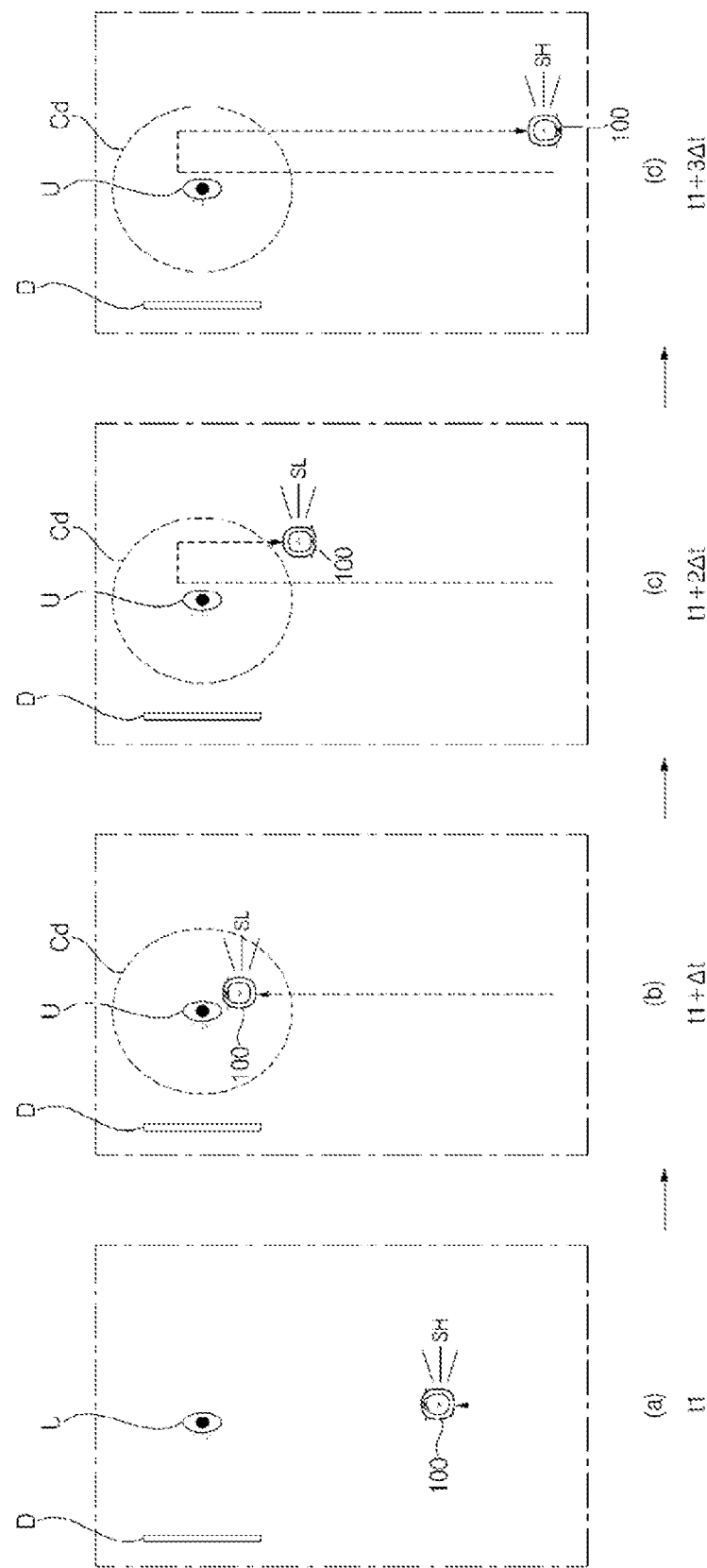
FIG. 12 is a plan view of a scenario where a low noise mode is activated/deactivated when a user U is watching a TV.

Hereinafter, a scenario where the low noise mode change function is turned on will be described with reference to FIGS. 11 and 12. FIGS. 11 and 12 show scenarios in which a low noise mode is switched to an activated state or a deactivated state in the case where two or more users U1 and U2 are talking in person or where a certain user U is watching a TV. FIGS. 11 and 12 are conceptual diagrams as seen above, wherein SH indicates relatively high level noise in the deactivated state of the low noise mode, SL indicates relatively low noise in the activated state of the low noise mode, and Cd indicates an application distance range from a corresponding user(s). In FIGS. 11 and 12, drawings (a), (b), (c), and (d) show situations occurring in a sequence over time, and, for convenience of explanation, a situation sensed at an initial time t1 and situations sensed at a predetermined time interval Δt since the initial time t1 are illustrated.

With reference to FIG. 11, two users U1 and U2 are talking in person from the time t1 through a time t1+3·Δt, and the moving robot 100 acquires the situation information while keeping moving. With reference to section (a) in FIG. 11, the moving robot 100 performs a specific operation while generating relatively loud noise in the deactivated state of the low noise mode.

With reference to section (b) in FIG. 11, when moving with performing the specific operation, the moving robot 100 determines that the in-person talking condition is satisfied, based on situation information regarding the two users U1 and U2. In addition, the moving robot 100 moves into the range Cd, senses situation information regarding a distance between a corresponding user U1 or U2 and the moving robot 100, and determines that even the application distance condition is satisfied. The moving robot 100 determines that the activation condition is satisfied. Accordingly, the moving robot 100 switches the low noise mode to the activation state to perform the specific operation while generating relatively soft noise.

Referring to section (c) in FIG. 11, when moving in the activation state of the low noise mode, the moving robot 100 moves out of the range Cd and senses situation information regarding a distance between the corresponding user U1 or U2 and the moving robot 100 and determines that a distance release condition is satisfied (that is, an application distance condition is not satisfied). However, at the current time t1+2·Δt, the delay time has not elapsed since the moving robot 100 moved out of the range Cd, and thus, the moving robot 100 determines that the delay time condition is not satisfied. The moving robot 100 determines that the deactivation condition is not satisfied. Accordingly, at the current time t1+2·Δt, the moving robot 100 maintains the low noise mode activated.

With reference to section (d) in FIG. 11, the moving robot 100 keeps moving over a traveling region out of the range Cd and determines that the distance release condition and the delay time condition are all satisfied. The moving robot 100 determines that the deactivation condition is satisfied. Accordingly, the moving robot 100 switches the low noise mode to the deactivated state to perform the specific operation while generating relatively loud noise.

Referring to FIG. 12, from the time t1 through the time t1+3·Δt, the user U has been watching a TV D and the moving robot 100 has been acquiring the situation information while keeping moving. With reference to section (a) in FIG. 12, in the deactivated state of the low noise mode, the moving robot 100 performs a specific operation while generating relatively loud noise.

With reference to section (b) in FIG. 12, when moving while performing the specific operation, the moving robot 100 determines that the watching and listening condition is satisfied, based on situation information regarding the user U and the TV D. In addition, the moving robot 100 moves into the range Cd, senses situation information regarding a distance between the user U and the moving robot 100, and determines that even the application distance condition is satisfied. The moving robot 100 determines that the activation condition is satisfied. Accordingly, the moving robot 100 switches the low noise mode to the activated state to perform the specific operation while generating relatively soft noise.

With reference to section (c) in FIG. 12, when moving in the activated state of the low noise mode, the moving robot 100 moves out of the range Cd, senses situation information regarding a distance between the user U and the moving robot 100, and determines that a distance release condition is satisfied (that is, the application distance condition is not satisfied). However, at the current time t1+2·Δt, the delay time has not elapsed since the moving robot 100 moved out of the range Cd, and thus, the moving robot 100 determines that the delay time condition is not satisfied. The moving robot 100 determines that the deactivated condition is not satisfied. Accordingly, at the current time t1+2·Δt, the moving robot 100 keeps the low noise mode activated.

With reference to section (d) in FIG. 12, the moving robot 100 keeps moving over a traveling region out of the range Cd and determines that the distance release condition and the delay time condition are all satisfied. The moving robot 100 determines that the deactivation condition is satisfied. Accordingly, the moving robot 100 switches the low noise mode to the deactivation state to perform the specific operation while generating relatively loud noise.

Meanwhile, in some embodiments, if it is determined, based on situation information sensed by the sensing unit, that a corresponding user is performing the specific behavior, the controller 140 may control the moving robot 100 to travel while avoiding the application distance range Cd from the user. In one example, the controller 140 may control the moving robot 100 to perform the specific operation in a manner of first moving over a traveling region out of the range Cd and then moving over at raveling region within the range Cd. In another example, the controller 140 may control the moving robot 100 to perform the specific operation in a manner of moving only over the traveling region out of the range Cd.

An embodiment may be achieved in a whole or in parts to reduce noise pollution created by a moving robot to a user. If a noise prevention device is added to reduce noise caused by the moving robot, it leads to an increase in manufacturing costs of the moving robot. The second objective of the present invention is to address this drawback.

If power or speed for performing an operation by a moving robot is increased, the moving robot generates louder noise and it would cause user inconvenience. On the other hand, if the power or speed is decreased, it may significantly reduce operation efficiency. The third objective of the present invention is to address this drawback.

Noise generated by a moving robot bothers a user in specific situations, for example, in which the user is having a conversation, talking on a phone, reading something, or watching a television. In this case, the user needs to manually reduce power of the moving robot or turn off the moving robot, but even this causes inconvenience to the user. The fourth objective of the present invention is to address this drawback.

Aspects of the present application provide a moving robot capable of automatically activating or deactivating a low noise mode depending on an ambient situation.

An embodiment may be achieved in a whole or in parts by a moving robot including: a traveling unit configured to move a main body; an operation unit configured to perform a specific operation while generating noise; a sensing unit configured to sense an ambient situation during traveling; and a controller configured to activate or deactivate, based on situation information sensed by the sensing unit, a low noise mode in which the operation unit performs the specific operation while relatively reducing the noise.

The controller may determine whether a specific activation condition is satisfied, based on the situation information, and activate the low noise mode when the activation condition is determined to be satisfied. The activation condition may include a situation condition that is preset to be satisfied when a specific behavior of at least one corresponding user is sensed.

The activation condition further may include an application distance condition that is preset to be satisfied when a sensed distance between the corresponding user and the moving robot is within a specific application distance. The activation condition may include a condition in which the situation condition and the application distance condition are satisfied.

The moving robot may further include a communication module through which information is input or received, and it may be possible to change the application distance based on the information input or received through the communication module. A plurality of situation conditions may be preset, and the activation condition may include a condition in which at least one of the plurality of situation conditions is satisfied. It may be possible to select applying each of the plurality of situation conditions individually. The controller may be further configured to: in an activated state of the low noise mode, based on the situation information, determine whether a specific deactivation condition is satisfied; and, when the deactivation condition is determined to be satisfied, deactivate the low noise mode.

The activation condition may include a situation condition that is preset to be satisfied when at least one corresponding user is performing a specific behavior. The deactivation condition may include a situation release condition that is preset to be satisfied when the situation condition is not satisfied.

The activation condition may include an application distance condition that is preset to be satisfied when a sensed distance between at least one corresponding user performing a specific behavior and the moving robot is within a specific application distance. The activation condition may include a distance release condition that is preset to be satisfied when the application distance condition is not satisfied. The deactivation condition may include a delay time condition that is preset to be satisfied when a specific delay time elapses with the activation condition not satisfied. The deactivation condition may include a delay time condition that is preset to be satisfied when a specific delay time elapses with the sensed distance exceeding the application distance.

It may be possible to change the delay time based on information input or received through the communication module. Also, it may be possible to select a noise level of the low noise mode based on the information input or received through the communication module.

The operation unit may include a motor for performing the operation. The controller may control the motor to consume relatively low power or rotate at a relatively slow speed in the activated state of the low noise mode.

An embodiment may be achieved in a whole or in parts by a control method of a moving robot, the method including: based on situation information acquired by sensing an ambient situation during traveling, determining whether a specific activation condition is satisfied; and, when the activation condition is determined to be satisfied, performing a specific operation in an activated state of a low noise mode in which noise is relatively reduced.

The method may further include: based on situation information by sensing an ambient situation in the activated state of the low noise mode, determining whether a specific deactivation condition is satisfied; and, when the deactivation condition is determined to be satisfied, performing the specific operation in a deactivated state of the low noise mode. In doing so, the moving robot may relieve inconvenience that a user may feel due to noise generated during operation of the moving robot.

As the low noise mode switches to an activated state or a deactivated state depending on the ambient situation, it is possible to reduce noise for the sake of the user when necessary, and to maximize operation efficiency of the moving robot when it is not necessary to reduce noise. As the low noise mode is activated and deactivated depending on determination of the controller, and therefore, it takes less time for a user to switch a mode of the moving robot, thereby enabling the user to concentrate more on having a conversation, talking on a phone, or reading/listening something.

By presetting the situation condition, it is possible to provide an environment where a user can concentrate a specific behavior, while enhancing operation efficiency of the moving robot. By presetting the application distance condition, it is possible to generate low level noise within a range, where the user may hear the same noise relatively loudly, and to allow the moving robot to efficiently perform an operation in a range other than the aforementioned range.

As the plurality of situation conditions are preset, a low-noise environment may be provided for a user's various behaviors. As it is possible to change the application distance, the application distance may be changed by taking into consideration the user's auditory acuity or sensitivity or may be set differently with respect to each of multiple behaviors for which the low noise mode is required.

By presetting the delay time, it is possible to prevent the low noise mode from frequently switching to the activated/deactivated state. In particular, in the case where the moving robot operates by moving over the boundary of a region to which a sensed distance from a corresponding user is within the application distance, it is possible to prevent a possibility that unnecessary switching between the activated state and deactivated state of the low noise mode causes inconvenience to the user or that operation efficiency of the moving robot is reduced. As it is possible to select the noise level, a low noise level or a high operation efficiency of the moving robot may be selected depending on a user's preference.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
 a motor that is selectively driven in one of a first mode or a second mode to perform an operation, the moving robot generating a relatively less noise in the second mode than in the first mode;
 a sensor that detects information associated with a region in which the moving robot is traveling; and
 a controller that:
  determines, based on information detected by the sensor, whether an activation condition is satisfied, and
  based on determining that the activation condition is satisfied, manages the motor to switch from performing the operation in the first mode to performing the operation in the second mode,
 wherein the controller determines that the activation condition is satisfied when the controller determines that at least one of a plurality of situation conditions is satisfied and when a sensed distance between a user and the moving robot is less than or equal to a threshold distance, and the plurality of situation conditions relate to different activities by the user,
 wherein the controller determines, based on information detected by the sensor while the motor is operating in the second mode, whether a deactivation condition is satisfied,
 wherein, when the deactivation condition is determined to be satisfied while the motor is operating in the second mode, the controller manages the motor to switch back to performing the operation in the first mode,
 wherein the threshold distance of the activation condition is set differently for the plurality of situation conditions,
 wherein a level of noise in the second mode, which is reduced compared to the first mode, is set differently for the plurality of situation conditions of the activation condition,
 wherein the deactivation condition is determined to be satisfied when a threshold length of time elapses while the sensing distance is greater than the threshold distance, and
 wherein the threshold length of time of the deactivation condition is set differently for the plurality of situation conditions.

2. The moving robot according to claim 1, further comprising an interface through which information is input or received,
 wherein the threshold distance is determined based on information input or received through the interface.

3. The moving robot according to claim 1, wherein the controller selectively applies each of the plurality of situation conditions individually.

4. The moving robot according to claim 1, wherein the controller determines that the activation condition is satisfied when the controller determines that the user and another user are located within a prescribed distance of the moving robot and are talking to each other.

5. The moving robot according to claim 1, wherein the controller determines that the activation condition is satisfied when the controller determines that the user is talking on a telephone.

6. The moving robot according to claim 1, wherein the controller determines that the activation condition is satisfied when the controller determines that the user is reading.

7. The moving robot according to claim 1, wherein the controller determines that the activation condition is satisfied when the controller determines that the user is watching a video or listening to audio.

8. The moving robot according to claim 1, wherein:
 the activation condition is determined to be satisfied when the controller determines at least one user is performing a specific behavior, and
 the deactivation condition is determined to be satisfied when the controller determines that the at least one user is no longer performing the specific behavior.

9. The moving robot according to claim 1, wherein:
 the activation condition is determined to be satisfied when a sensed distance between at least one user performing a specific behavior and the moving robot is equal to or less than a threshold distance.

10. The moving robot according to claim 1, wherein the deactivation condition is determined to be satisfied when the controller determines that the activation condition is not satisfied during a threshold length of time after the motor is switched to the second mode.

11. The moving robot according to claim 10, further comprising an interface through which information is input or received,
 wherein the threshold length of time is determined based on information input or received through the interface.

12. The moving robot according to claim 1, further comprising an interface through which information is input or received,
 wherein the controller further manages the motor such that an amount of noise generated during the second mode satisfies a noise level that is determined based on information input or received through the interface.

13. The moving robot according to claim 1, wherein the controller, when managing the motor to switch to performing the operation in the second mode, controls the motor to, at least one of, consume relatively less power or rotate at a relatively slower speed in comparison to the first mode.

14. The moving robot according to claim 1, wherein the motor is a first motor, and the moving robot further comprises a second motor that is selectively driven to cause the moving robot to perform a travel operation that differs from the operation performed using the first motor.

15. A method to control a moving robot, the method comprising:
- determining whether an activation condition is satisfied based on sensing information about a region in which the moving robot is performing a traveling operation; and
- controlling the robot to switch from performing a cleaning operation in a first mode to performing the cleaning operation in a second mode in which noise outputted by the moving robot is reduced in comparison to the first mode, when the activation condition is determined to be satisfied, wherein the method further comprises:
- determining that the activation condition is satisfied when at least one of a plurality of situation conditions is satisfied and when a sensed distance between a user and the moving robot is less than or equal to a threshold distance, the plurality of situation conditions relating to different activities by the user,
- determining, based on sensed information detected while the robot is performing the cleaning operation in the second mode, whether a deactivation condition is satisfied;
- managing, when the deactivation condition is determined to be satisfied, the robot to switch back to performing the cleaning operation in the first mode, and
- setting the threshold distance of the activation condition differently according to the situation conditions,
- setting a level of noise in the second mode, which is reduced compared to the first mode, differently for the plurality of situation conditions of the activation condition, wherein the deactivation condition is determined to be satisfied when a threshold length of time elapses while the sensing distance is greater than the threshold distance, and wherein the threshold length of time of the deactivation condition is set differently for the plurality of situation conditions.

* * * * *